United States Patent [19] BEST AVAILABLE COPY

Koganezawa et al.

[11] 3,895,191

[45] July 15, 1975

[54] METHOD AND APPARATUS FOR MEASUREMENT OF CHANNEL SEPARATION IN AMPLIFIER OR THE LIKE

[75] Inventors: Tadayoshi Koganezawa; Ryoji Shiozawa; Katsumi Takai, all of Tokyo, Japan

[73] Assignee: Trio Electronics Inc., Tokyo, Japan

[22] Filed: June 18, 1974

[21] Appl. No.: 480,418

[30] Foreign Application Priority Data

June 18, 1973 Japan ................................ 48-68440

[52] U.S. Cl....179/15 BT; 179/15 BF; 179/100.4 ST; 325/363; 325/67; 179/1 G

[51] Int. Cl. .............................................. H04h 5/00

[58] Field of Search........... 179/15 BT, 15 AN, 1 G, 179/15 BF, 175, 175.1, 100.4 ST, 100.1 TD; 325/36.3, 36, 67; 360/31; 324/76

[56] References Cited

UNITED STATES PATENTS

| | | | |
|---|---|---|---|
| 2,987,586 | 6/1961 | Berger | 179/15 BF |
| 3,171,897 | 3/1965 | Wlasuk | 179/15 BT |
| 3,522,379 | 7/1970 | Verlinden | 179/15 BT |

OTHER PUBLICATIONS

"Stereo Signal Generator", PF Reporter, Sept. 1963, p. 58, 60, 62.

"Kit–Form Stereo Generator", PF Reporter, Oct. 1963, p. 76, 79 by F. H. Belt.

"Anomalies of Presently Accepted FM Stereo Measurement Technique", Journal AES, April 1963, p. 160, 162, 164, 166.

*Primary Examiner*—Kathleen H. Claffy
*Assistant Examiner*—Thomas D'Amico
*Attorney, Agent, or Firm*—Gerald J. Ferguson, Jr.; Joseph J. Baker

[57] ABSTRACT

Apparatus and method for measuring channel separation in a transmission circuit having at least first and second transmission channels, the apparatus comprising applying means for respectively applying to the first and second transmission channels first and second test signals of different frequency; first detecting means responsive to the first transmission channel for producing a first beat frequency signal, the amplitude of which is a function of the cross-talk from said second transmission channel to the first transmission channel and the frequency of which is the difference in frequency between the first and second test signals; and first measuring means responsive to the amplitude of the first beat frequency signal to obtain a measurement of the cross-talk from the second transmission channel to the first transmission channel.

14 Claims, 4 Drawing Figures

PATENTED JUL 15 1975 3,895,191

METHOD AND APPARATUS FOR MEASUREMENT OF CHANNEL SEPARATION IN AMPLIFIER OR THE LIKE

BACKGROUND OF THE INVENTION

1. Field of the Invention:

The present invention is directed to a method and apparatus for measurement of channel separation in an amplifier or the like having multi-channel transmission circuits such as two-channel or four-channel stereo equipment.

2. Discussion of the Prior Art

To effect channel separation between stereo signals in a FM tuner device, a switching type demodulation circuit is usually used; however, deterioration of channel separation due to cross-talk between the two stereo signals is encountered. This condition may also be encountered in stereo amplifiers, stereo pick-up cartridges, stereo tape recorders and other stereo equipment. Although it is generally said that a channel separation of 40 db in a FM stereo tuner and 25 db in a stereo pick-up cartridge may be obtained when they are in their best condition, deterioration of channel separation due to cross-talk is nevertheless a very important problem.

In the prior art, channel separation between two channels has been measured by utilizing the method and equipment shown in FIG. 1, in which a suitable test signal is applied to input terminal $CH_1$ of one transmission channel. The cross-talk component obtained at output terminal $CH_{2'}$ of the other channel is compared with the signal transmitted and obtained at output terminal $CH_{1'}$. In this method, the signal level at output terminal $CH_{1'}$ must be checked at various times. Further, the level of the test signal should be stabilized. Accordingly, the measurement operation may be a time consuming and troublesome job. Another disadvantage of this method is that direct reading is impossible.

SUMMARY OF THE INVENTION

The present invention overcomes the disadvantages described above, and effects channel separation measurement simply by operating switches of measuring equipment to obtain direct readings without any correction even when there may be variation in the level of the input signal.

Other objects and advantages of this invention will become apparent after a reading of the specification and claims taken with the drawing.

DETAILED DESCRIPTION OF THE PREFERRED EMBODIMENTS

Figure 1:
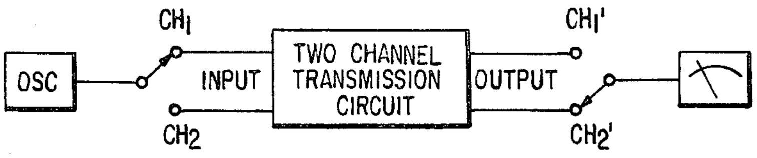
FIG. 1 (PRIOR ART)
FIG. 1 is a block diagram of a measurement system according to the prior art.
Figure 2:
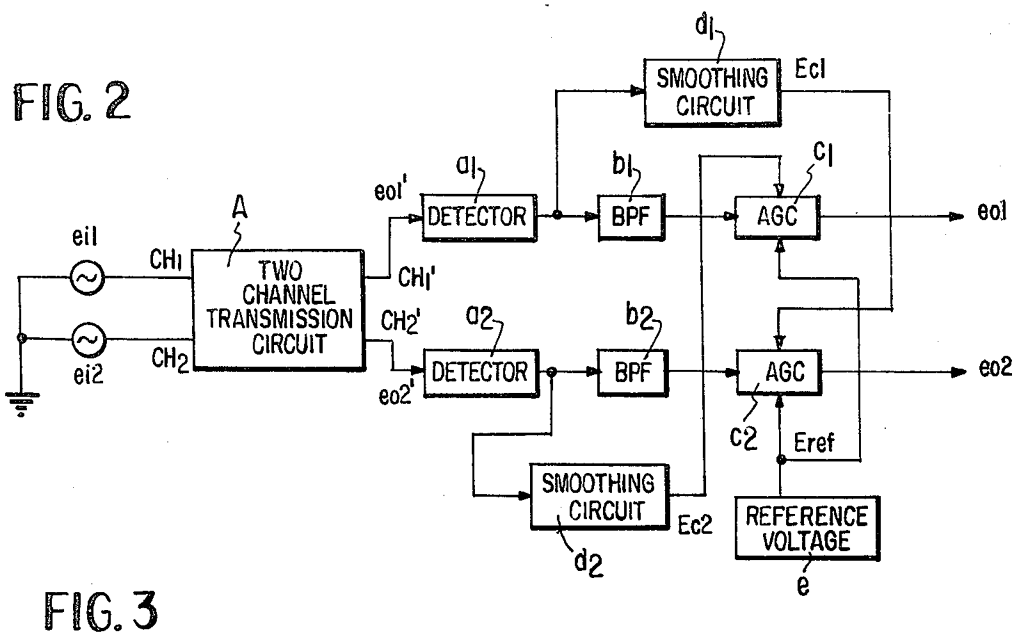
FIG. 2 is a block diagram of a illustrative measurement system according to the present invention.

Referring to FIG. 2, there is shown a block diagram of an illustrative measuring system in accordance with the invention. A two-channel transmission circuit A such as a stereo amplifier is to have its cross-talk component measured. Signals $ei_1$ and $ei_2$ are applied to input terminals $CH_1$ and $CH_2$ respectively. These signals have different frequencies, the output terminals of transmission circuit A are $CH_{1'}$ and $CH_{2'}$. A detecting circuit is provided and comprises detector circuits $a_1$ and $a_2$ and band-pass filters $b_1$ and $b_2$ which have pass-band at the difference frequency between input signals $ei_1$ and $ei_2$ (beat frequency). Also provided are automatic gain control amplifiers $c_1$ and $c_2$, smoothing circuits $d_1$ and $d_2$ together with a reference voltage generating circuit $e$. The reference voltage generating circuit $e$, the smoothing circuits $d_1$, $d_2$ and the amplifiers $c_1$, $c_2$ are connected to form an automatic gain control system in which the detected voltages from the detector circuits $a_1$ and $a_2$ are applied to the smoothing circuits $d_1$ and $d_2$ respectively to be smoothed and the output signals $Ec_1$ and $Ec_2$ of the smoothing circuits are in turn applied to the amplifier $c_1$ and $c_2$ to which the signal Eref from the reference voltage generating circuit e is also applied. The signals $Ec_1$ and $Ec_2$ applied to the amplifier $c_1$ and $c_2$ respectively are compared with the reference voltage signal $Eref$, and the difference signals will control the voltage gain of the respective amplifiers $c_1$ and $c_2$ so that cross-talk level will be obtained on the condition that the voltage $Ec_1$ and $Ec_2$ are equal to the reference voltage $Eref$. Reference characters $eo_{1'}$ and $eo_{2'}$ show the output signals at the output terminals $CH_{1'}$ and $CH_{2'}$, and $eo_1$ and $eo_2$ show the output signals from the amplifier $c_1$ and $c_2$ respectively.

From the foregoing it can be seen how the above circuitry will automatically correct any variations or imbalance between the test signals $ei_1$ and $ei_2$. Thus, assuming an extreme example, if $ei_1$ equaled two volts and $ei_2$ equaled one volt, the cross-talk component from channel 1 to channel 2 would be much greater than that from channel 2 to channel 1. Incorrect cross-talk measurements would thus result unless corrective action were implemented. The corrective action is effected by controlling the gain of AGC amplifier $c_2$, for example with the difference signal between $Eref$ and $Ec_1$. Thus, the output $eo_2$ of $c_2$, which is the measured cross-talk component from channel 1 to channel 2, will be decreased by a relatively substantially amount because the detected average value $Ec_1$ of $eo_{1'}$ will be relatively large, it being assumed above $ei_1$ was 2 volts. The relatively large value of $Ec_1$ will decrease the gain of AGC amplifier $c_2$ to thereby compensate for the relatively large cross-talk component coupled to channel 2 from channel 1. The amount of control of $Ec_1$ over AGC amplifier $c_2$ can be controlled by adjusting the value of Eref as desired.

By the same token, the gain of AGC amplifier $c_1$ will be decreased less (or possibly increased more) than that of AGC amplifier $c_2$ since the average value $Ec_2$ of $eo_{2'}$ will be less than that of $eo_{1'}$, it being assumed as stated before that $ei_2$ was only 1 volt. Hence, the aforementioned corrective action is such as to restore any imbalance which might occur between $eo_1$ and $eo_2$, the gain of AGC amplifier $c_2$ being decreased more than that of AGC amplifier $c_1$ to compensate for the unduly large cross-talk component coupled from channel 1 to channel 2.

In the system described above, suppose that input signal $ei_2$ is applied to input terminal $CH_2$ and some cross-talk component appears at output terminal $CH_{1'}$.

Assuming the amplitude of input signals $ei_1$ and $ei_2$ applied to transmission circuit A are $A_1$ and $B_1$ respectively, the output signal $eo_{1'}$ at output terminal $CH_{1'}$ may be described as:

$$eo_{1'}\ (t) = Aei_1(t) + Bei_2(t) \quad (1)$$

where $ei_1(t) = \cos\omega_1 t$, $ei_2(t) = \cos\omega_2 t$, and $\omega_1$, $\omega_2$ are angular frequencies and $\omega_1 < \omega_2$ in this instance. Consequently, the equation (1) may be expressed as $$eo_{1'}\ (t) = A\cos\omega_1 t + B\cos\omega_2 t \quad (2)$$

Equation (2) may be reduced to $$eo_{1'}\ (t) = y(t)\ \cos\{\omega_1 + \omega_2/2\ t - \phi(t)\} \quad (3)$$

where $y(t) = \sqrt{A^2 + B^2 + 2AB\cos(\omega_2 - \omega_1)t}$ (amplitude function) and $\phi(t) = \tan^{-1}\ [\{(A-B)/(A+B)\}\ .\ \tan\ \omega_2 - \omega_1/2\ t]$ (phase angle)

If the cross-talk component is described by the term $Bei_2(t)$, the inequality $B << A$ will be valid and accordingly the amplitude function $y(t)$ may approximately be reduced to $$y(t) \approx A + B\cos(\omega_2 - \omega_1)t$$

where $(\omega_2 = \omega_1)$ is beat frequency.

Consequently the equation (3) may be written as $$eo_{1'}\ \ (t) = \{A + B\cos(\omega_2 - \omega_1)t\}\ \cos\omega_1 + \omega_2/2\ t - \phi(t)$$

Thus, when this $eo_{1'}$ $(t)$ is detected by detector circuit $a_1$ and filtered through band-pass filter $b_1$, the cross-talk component will be obtained. This signal is amplified in gain-controlled amplifier $c_1$ and output signal $eo_1$ is obtained. And then signal $eo_1$ may be rectified to get a dc output voltage signal.

From the foregoing, the principle of the present invention sould be apparent.

Figure 3:
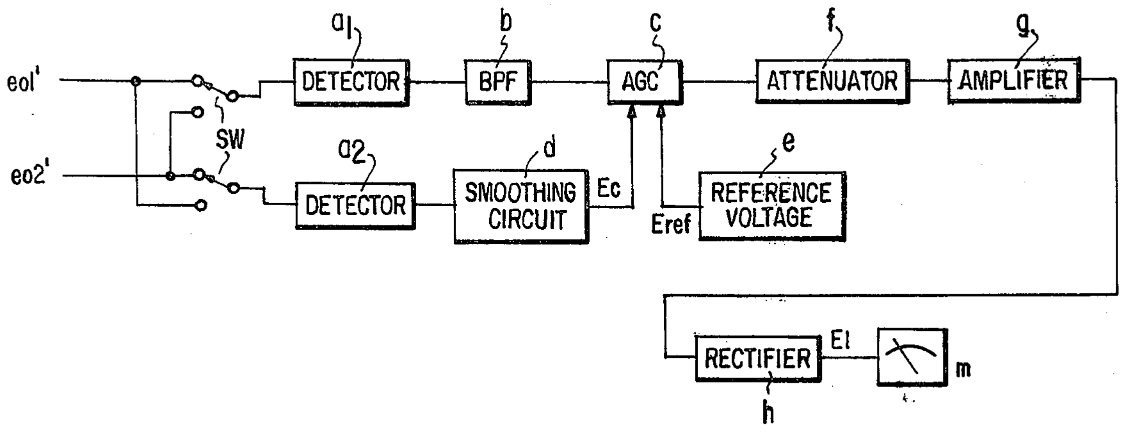
FIG. 3 is a block diagram of another illustrative embodiment of the present invention.

Now referring to FIG. 3, reference characters $eo_1$ and $eo_{2'}$ are the output signals of transmission circuit A shown in FIG. 2. A transfer switch SW measures the cross-talk of channel $CH_1$ to channel $CH_2$ and vice versa. There is provided detector circuits $a_1$ and $a_2$, smoothing circuit d, reference voltage source $e$, band-pass filter $b$, gain-controlled amplifier $c$, an attenuator $f$, an amplifier $g$, a rectifier circuit $h$, and indication device $m$ such as a volt-meter. Operation of this channel separation measurement apparatus is substantially the same as that of the system shown in FIG. 2. Thus the dc voltage $Ei$ represents the cross-talk component under the condition that the voltage $Ec$ obtained by rectifying the output $eo_{2'}$ of the measured transmission circuit is effectively equal to the reference voltage $Eref$. In order to measure the reverse cross-talk component, that is, the cross-talk from channel $CH_1$ to channel $CH_2$, the transfer switch is turned over to interchange the input signals. Of course, the cross-talk components for both input signals $ei_{1'}$ and $ei_{2'}$ can be measured at the same time by utilizing an additional circuit as shown in FIG. 3. From the description, it can be seen that with the channel separation measurement apparatus in accordance with this invention, it is not necessary to check and correct the level of the transmitted signal, and accordingly precise measurements may be made without any undesired influence of level variation in the input signal source which might be an oscillator, for example.

In order to measure channel separation successfully in accordance with this invention, the angular frequencies $\omega_1$ and $\omega_2$ should be so selected that the beat frequency $\omega_2 - \omega_1$ is sufficiently separated from $(\omega_1 + \omega_2)/2$ so that the component of angular frequency $(\omega_1 + \omega_2)/2$ will not affect measuring error and the band-pass filter can be adequately designed. Although the beat frequency $\omega_2 - \omega_1$ should be as low as possible, 20 Hz might be the lower limit due to an increase of measuring error in the indicating device. Actually, measurement can not be carried out at less than 1 Hz.

When the transmission circuit to be measured has many channels, the measurement may easily be accomplished by increasing the number of the input signals in FIG. 2 or extending the change-over switch SW of FIG. 3.

Figure 4:
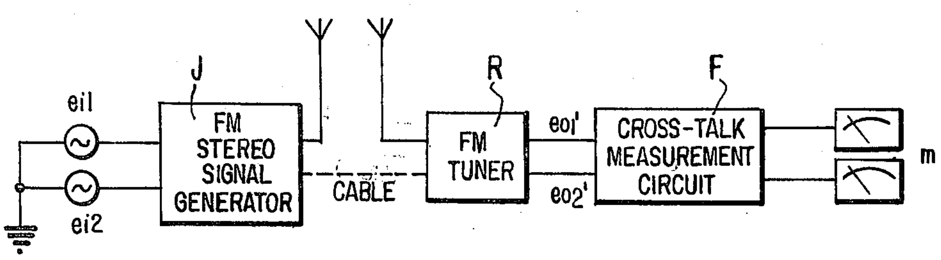
FIG. 4 is a block diagram illustrating a typical cross-talk measurement application of the invention.

Now another embodiment of the present invention will be described with respect to FIG. 4 wherein an FM tuner R is the transmission circuit to be measured. A FM stereo signal generator J generates an FM stereo signal by combining two input signals $ei_1$ and $ei_2$ having different frequencies. The stereo signal is transmitted by way of radio carrier wave or cable so that FM tuner R can receive and demodulate the stereo signal to obtain output signals $eo_{1'}$ and $eo_{2'}$. Measuring circuitry S corresonds to that shown in FIGS. 2 or 3 and indicator devices m are also provided. This embodiment illustrates a particular advantage of the invention in that a stereo measurement signal can be transmitted as radio wave, the signal being readily utilized to adjust the separation of FM tuners everywhere in a manufacturing plant.

With stereo pick-up cartridges, channel separation can be measured by reproducing a stereo disc record on which two signals of different frequency are recorded. In the case of tape recorders, channel separation for the magnetic head or the over all apparatus can be measured by recording and/or reproducing two different signals.

From the foregoing, the advantages of the present invention may be summarized as follows:

1. It is possible to measure channel separation by using input signals without any changeover circuit.
2. It is possible to measure channel separation by direct reading without checking and correcting the transmitted signal.
3. Measurement is not affected by the fluctuation of the frequency of the input signal.
4. The frequency of the two input signals may be selected arbitrarily so long as the difference between them (beat frequency) is within certain limits.
5. It can be implemented anywhere in the manufacturing line because of its simplicity and low cost.
6. Automatization of measurement can be easily achieved.

What is claimed is:

1. Apparatus for measuring channel separation in a transmission circuit having at least first and second transmission channels, said apparatus comprising:

applying means for respectively applying to said first and second transmission channels first and second test signals of different frequency;

first detecting means responsive to said first transmission channel for producing a first beat frequency signal, the amplitude of which is a function of the cross-talk from said second transmission channel to said first transmission channel and the frequency of which is the difference in frequency between said first and second test signals; and first measuring means responsive to the amplitude of said first beat frequency signal to obtain a measurement of said cross-talk from said second transmission channel to said first transmission channel.

2. Apparatus as in claim 1 including a first band pass filter means responsive to said first detecting means for extracting said first beat frequency signal from the output of said first detecting means.

3. Apparatus as in claim 2 where the frequency of said first test signal is $\omega_1$ and that of said second test signal is $\omega_2$ and $\omega_1 \sim \omega_2$ is sufficiently different from $(\omega_1 + \omega_2)/2$ so that said first band pass filter means can extract said first beat frequency signal from said output of said first detecting means.

4. Apparatus as in claim 1 including second detecting means responsive to said second transmission channel for producing a first control signal corresponding to the average value of the signal in said second transmission channel and first automatic gain control amplifying means responsive to said first detecting means for amplifying said first beat frequency signal, the gain of said first automatic gain control amplifying means being a function of said first control signal.

5. Apparatus as in claim 4 including a reference control signal source and means for controlling the gain of said first automatic gain control amplifying means with the difference signal between said first control signal and said reference control signal.

6. Apparatus as in claim 4 including switch over means for connecting said first detecting means to the output of said second transmission channel and said second detecting means to the output of said first transmission channel so that the cross-talk from said first transmission channel to said second transmission channel can be measured.

7. Apparatus as in claim 4 where said second detecting means includes means for producing a second beat frequency signal, the amplitude of which is a function of the cross-talk from said first transmission channel to said second transmission channel and the frequency of which is the difference in frequency between said first and second test signals and where said first detecting means includes means for producing a second control signal corresponding to the average value of the signal in said first transmission channel, said apparatus including second automatic gain control amplifying means responsive to said second detecting means for amplifying said second beat frequency signal, the gain of said second automatic gain control amplifying means being a function of said second control signal; and second measuring means responsive to the amplitude of said second beat frequency signal to obtain a measurement of said cross-talk from said first transmission channel to said second transmission channel.

8. Apparatus as in claim 7 including a reference control signal source and means for controlling the gain of said second automatic gain control amplifying means with the difference signal between said second control signal and said reference control signal.

9. Apparatus as in claim 7 including a second band pass filter means responsive to said second detecting means for extracting said second beat frequency signal from the output of said second detecting means.

10. Apparatus as in claim 1 where said transmission circuit is a stereo receiver and said applying means includes means for radiating said first and second test signals to said stereo receiver as a stereo test signal.

11. A method for measuring channel separation in a transmission circuit having at least two transmission channels comprising the steps of:

respectively applying at least two signals of different frequency to said two transmission channels and measuring the level of the beat frequency signal generated by interaction between the cross-talk component which is developed during transmission and one of said two applied signals.

12. Method for measuring channel separation in a transmission circuit having at least first and second transmission channels, said method comprising the steps of;

respectively applying to said first and second transmission channels first and second test signals of different frequency;

producing, in response to said first transmission channel, a first beat frequency signal, the amplitude of which is a function of the cross-talk from said second transmission channel to said first transmission channel and the frequency of which is the difference in frequency between said first and second test signals; and measuring, in response to the amplitude of said first beat frequency signal, said cross-talk from said second transmission channel to said first transmission channel.

13. Method as in claim 12 including producing, in response to said second transmission channel, a first control signal corresponding to the average value of the signal in said second transmission channel and amplifying said first beat frequency signal and, controlling the amplification of said first beat frequency signal with said first control signal.

14. Method as in claim 12 including generating a reference control signal and controlling the amplification of said first beat frequency signal with the difference signal between said first control signal and said reference control signal.

* * * * *